United States Patent [19]

Commins

[11] 4,424,999

[45] Jan. 10, 1984

[54] GAS BOTTLE CARRYING CASE

[76] Inventor: Eric J. Commins, Chemin Neuf, 97417 - 1a Montagne, Reunion Island, France

[21] Appl. No.: 282,211

[22] Filed: Jul. 10, 1981

[30] Foreign Application Priority Data

Jul. 11, 1980 [FR] France ............................ 80 15763

[51] Int. Cl.³ .......................... B62B 1/26; B65G 7/12
[52] U.S. Cl. ................... 294/142; 280/47.26; 294/165
[58] Field of Search ............ 294/15, 27 R, 31.2, 294/67 D, 137, 141, 142, 148–151, 165, 166; 206/446, 477, 478; 211/71, 74; 248/129, 145.6, 146, 312; 280/47.19, 47.24, 47.26, 47.34, 47.35, 769; 414/444, 448, 449; 312/244, 249, 250, 280

[56] References Cited

U.S. PATENT DOCUMENTS

| | | | |
|---|---|---|---|
| 2,615,238 | 10/1952 | Highwood | 248/146 X |
| 2,667,397 | 1/1954 | Hallisey | 280/47.26 X |
| 3,279,811 | 10/1966 | Mitty et al. | 280/47.26 |
| 3,462,171 | 8/1969 | Mitty et al. | 280/47.26 |
| 3,565,384 | 2/1971 | Lockwood | 248/146 X |
| 3,805,988 | 4/1974 | Walker et al. | 248/146 X |
| 4,227,634 | 10/1980 | Ramsey et al. | 211/74 X |
| 4,253,716 | 3/1981 | Turner | 280/47.26 X |

*Primary Examiner*—Johnny D. Cherry

[57] ABSTRACT

A carrying case of generally rectangular box-like form with an open top contains a plurality of cradles for supporting a gas bottle on its side. Handles and casters are fitted to the case for ease in handling and lifting.

3 Claims, 3 Drawing Figures

GAS BOTTLE CARRYING CASE

BACKGROUND OF THE INVENTION

This invention relates to a carrying case for gas bottles for containing gases under pressure.

Gas bottles normally have a main cylindrical portion with a neck at one end of substantially smaller diameter, the neck containing inlet and/or outlet means for the passage of gases into and out of the bottle. The gas bottles are normally made of metal of substantial thickness to withstand the internal pressures of the gas. Due to the fact that the bottles are made of metal of substantial thickness the bottles are heavy and on account of their awkward shape are difficult to manipulate, store and transport.

SUMMARY OF THE INVENTION

In accordance with the present invention a carrying case for a gas bottle is provided which comprises a base, walls extending transversely from the base defining an internal space and a plurality of cradles in said space for supporting a gas bottle with the axis of the bottle lying parallel to the base. The base may have a generally rectangular configuration. The walls may be of a height such that they extend at least to half the circumference of a bottle contained in the case. Preferably, three cradles are provided in the case, two for supporting the cylindrical bottle of the body and one for supporting the neck.

A strap and means for anchoring opposite ends of the strap to the walls may be provided to secure a bottle on the cradles.

For ease in manipulation, storage and transport of the case with the bottle, carrying handles may be provided at various locations on the walls and retractable casters mounted on the case may also be provided.

Optionally, non-slip rubber strips may be secured to the exterior of the case.

BRIEF DESCRIPTION OF THE DRAWINGS

The invention will now be further described by way of example with reference to the accompanying drawings in which.

DETAILED DESCRIPTION OF A PREFERRED EMBODIMENT

Figure 1:
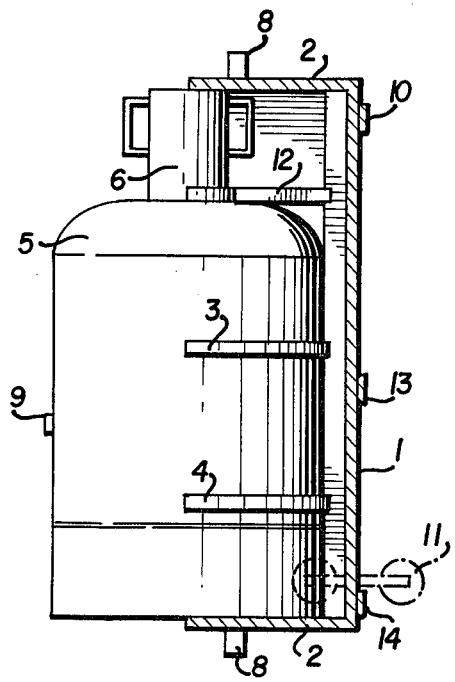
FIG. 1 is a side elevation partly in section of a case according to the invention in which a gas bottle is mounted.
Figure 2:
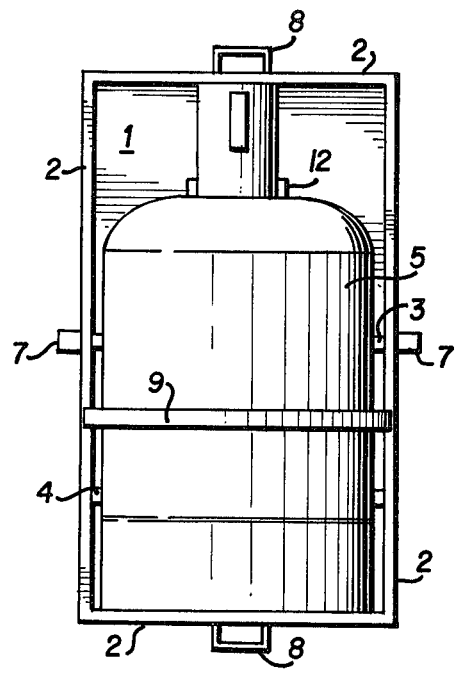
FIG. 2 is a plan view of said case with said bottle as shown in FIG. 1.

Referring to the drawings, a base 1 is of generally rectangular configuration with walls 2 extending upwardly from the sides thereof. Mounted on the base 1 are three cradles 3, 4 and 12, cradles 3 and 4 being adapted to support the cylindrical portion of a bottle 5 and the cradle 12 being adapted to support the neck 6 of the bottle 5.

Figure 3:
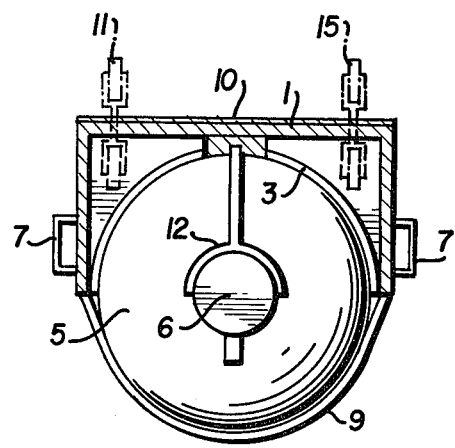
FIG. 3 is an end view partly in section of said case with said bottle as shown in FIGS. 1 and 2.

As illustrated in FIGS. 1 and 3, the heights of the walls 2 are such that the tops of said walls are about co-extensive with the axis of the bottle 5. Handles 7 and 8 are provided on the walls 2 for manually lifting and/or moving the case.

A strap 9 is arranged to pass over the bottle 5 with the ends thereof secured by fastening means to the opposite walls 2 of the case to retain the bottle 5 in place on the cradles 3, 4 and 12.

To prevent the case from sliding about, non-slip rubber strips 10, 13 and 14 are secured to the underside of the base 1. Also, retractable casters 11 and 15 may be mounted on the base 1 such that they can be extended to the position shown in dotted lines in FIGS. 1 and 3 to allow the case with the bottle 5 to wheeled by lifting the handle 8 remote from the casters 11 so that the case is supported on the casters 11 and 15.

The case and particularly the base 1 and walls 2 may be made of metal, wood or plastic material of sufficiently sturdy construction to bear the weight of a heavy gas bottle.

It is my intention to cover all changes and modifications of the invention herein chosen for purposes of disclosure which do not depart from the spirit and scope of the invention.

I claim:

1. A carrying case for a gas bottle comprising a cylindrical body portion and a neck portion having a cross-section less than that of said body portion, said case comprising a rectangular base; a wall extending transversely from each side of said base, said walls being joined at their ends to define with said base an internal space and extending to a height substantially equal to half the circumference of a gas bottle supported in said case such that the top edge of each of said walls is adjacent the surface of said gas bottle at its greatest cross-sectional width; cradle means mounted in said space for supporting said gas bottle with the axis thereof substantially parallel to said base, said cradle means comprising at least two cradles each mounted on said base, at least one of said cradles being adapted to support said cylindrical body portion of said gas bottle about substantially half its perimeter and one of said cradles being adapted to support said neck portion of said gas bottle; releasable strip means attached to opposite walls of said carrying case for retaining said gas bottle in place on said cradles; and a handle mounted on each of said walls adjacent said top edge thereof, said handles being mounted on the exterior surfaces of said respective walls.

2. A carrying case according to claim 1 further comprising a plurality of retractable casters mounted on said base.

3. A carrying case according to claim 2 further comprising a plurality of parallel, non-slip, rubber strips mounted on and extending across the entire width of the exterior of said base.

* * * * *